United States Patent
Minor et al.

(10) Patent No.: US 8,075,662 B2
(45) Date of Patent: Dec. 13, 2011

(54) NICKEL BRAZE ALLOY COMPOSITION

(75) Inventors: Michael Minor, Arlington, TX (US);
Paul M. Pellet, Arlington, TX (US);
Michael L. Miller, Euless, TX (US)

(73) Assignee: United Technologies Corporation, Hartford, CT (US)

( * ) Notice: Subject to any disclaimer, the term of this patent is extended or adjusted under 35 U.S.C. 154(b) by 894 days.

(21) Appl. No.: 12/109,398

(22) Filed: Apr. 25, 2008

(65) Prior Publication Data

US 2009/0266446 A1 Oct. 29, 2009

(51) Int. Cl.
*B22F 1/00* (2006.01)

(52) U.S. Cl. .............................. 75/255; 75/254; 148/24

(58) Field of Classification Search ................. 75/252, 75/254, 255; 148/24
See application file for complete search history.

(56) References Cited

U.S. PATENT DOCUMENTS

| | | | |
|---|---|---|---|
| 4,725,509 A | 2/1988 | Ryan | |
| 5,066,459 A | 11/1991 | Beltran et al. | |
| 5,182,080 A | 1/1993 | Beltran et al. | |
| 5,240,491 A | 8/1993 | Budinger | |
| 5,320,690 A | 6/1994 | Beltran et al. | |
| 5,523,170 A | 6/1996 | Budinger | |
| 5,902,421 A | 5/1999 | Christy | |
| 6,200,690 B1 | 3/2001 | Rabinkin | |
| 6,530,971 B1 | 3/2003 | Cohen et al. | |
| 7,017,793 B2 | 3/2006 | Kinstler | |
| 7,278,828 B2 | 10/2007 | Steplewski et al. | |
| 7,279,229 B2 | 10/2007 | Budinger et al. | |
| 2002/0157737 A1 | 10/2002 | Chesnes | |
| 2005/0067069 A1 | 3/2005 | Humm | |
| 2006/0081685 A1 | 4/2006 | Kinstler | |
| 2006/0081686 A1 | 4/2006 | Kinstler | |

FOREIGN PATENT DOCUMENTS

| | | |
|---|---|---|
| EP | 1258312 | 11/2002 |
| EP | 1783237 | 5/2007 |
| EP | 1859880 A | 11/2007 |

OTHER PUBLICATIONS

Extended European Search Report mailed on Jan. 22, 2010 for EP09251160.

*Primary Examiner* — George Wyszomierski
*Assistant Examiner* — Ngoclan Mai
(74) *Attorney, Agent, or Firm* — Carlson, Gaskey & Olds, P.C.

(57) ABSTRACT

A nickel braze alloy composition includes a blend of a first nickel alloy and a second nickel alloy. The first nickel alloy includes about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel. The second nickel alloy includes about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt %, and a balance of nickel.

11 Claims, 1 Drawing Sheet

NICKEL BRAZE ALLOY COMPOSITION

BACKGROUND OF THE INVENTION

This disclosure relates to nickel braze alloys and, more particularly, to a nickel braze alloy composition that provides enhanced environmental resistance.

Nickel braze alloys are commonly used to repair nickel alloy substrates, such as gas turbine engine components. For example, the nickel braze alloy may include a mixture of a high melting point nickel alloy and a lower melting point nickel alloy having a different composition. The nickel braze alloy may be applied to worn and/or damaged areas of the substrate and then heated to a brazing temperature to wet the surfaces of the worn and/or damaged area and flow into any pores or cracks. Upon cooling, the nickel braze alloy forms a composition that is a combination of the high melting point nickel alloy and the lower melting point nickel alloy.

One drawback of at least some known nickel braze alloys is reduced environmental resistance compared to the nickel alloy substrate. For example, the nickel alloy of the substrate forms an oxide scale that functions as an oxygen barrier to protect the underlying nickel alloy substrate from corrosion. However, the different composition of the nickel braze alloy may form an oxide scale that is unstable and prone to spalling. Consequently, the nickel braze alloy may not be capable of providing an equivalent degree of corrosion protection as the nickel alloy substrate. Thus, there is a need for a nickel braze alloy that provides enhanced environmental resistance.

SUMMARY OF THE INVENTION

An example nickel braze alloy composition includes a blend of a first nickel alloy and a second nickel alloy. The first nickel alloy includes about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel. The second nickel alloy includes about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt %, and a balance of nickel.

In another aspect, a nickel braze alloy composition includes about 20 wt %-80 wt % of a first nickel alloy and about 20 wt %-80 wt % of a second nickel alloy. The second nickel alloy has lower melting temperature than the first nickel alloy. The first nickel alloy includes up to about 0.02 wt % of boron, and the second nickel alloy includes boron in an amount no greater than 1.0 wt %.

In another aspect, a nickel braze alloy composition includes a blend of a first nickel alloy and a second, different nickel alloy. The blend includes a combined composition having about 8 wt %-20.3 wt % of chromium 1, about 5.5 wt %-6.7 wt % of aluminum, about 2.3 wt %-12.9 wt % of cobalt, about 0.7 wt %-7.2 wt % of tantalum, about 0.25 wt %-1.8 wt % of molybdenum, about 0.6 wt %-5.5 wt % of tungsten, up to 2.6 wt % of rhenium, about 1.1 wt %-5.1 wt % of silicon, boron in an amount no greater than 0.8 wt %, hafnium in an amount no greater than 1.6 wt %, up to about 0.12 wt % of carbon, up to about 0.3 wt % of zirconium, and a balance of nickel.

BRIEF DESCRIPTION OF THE DRAWINGS

The various features and advantages of the disclosed examples will become apparent to those skilled in the art from the following detailed description. The drawings that accompany the detailed description may be briefly described as follows.

DETAILED DESCRIPTION OF THE PREFERRED EMBODIMENT

Figure 1:
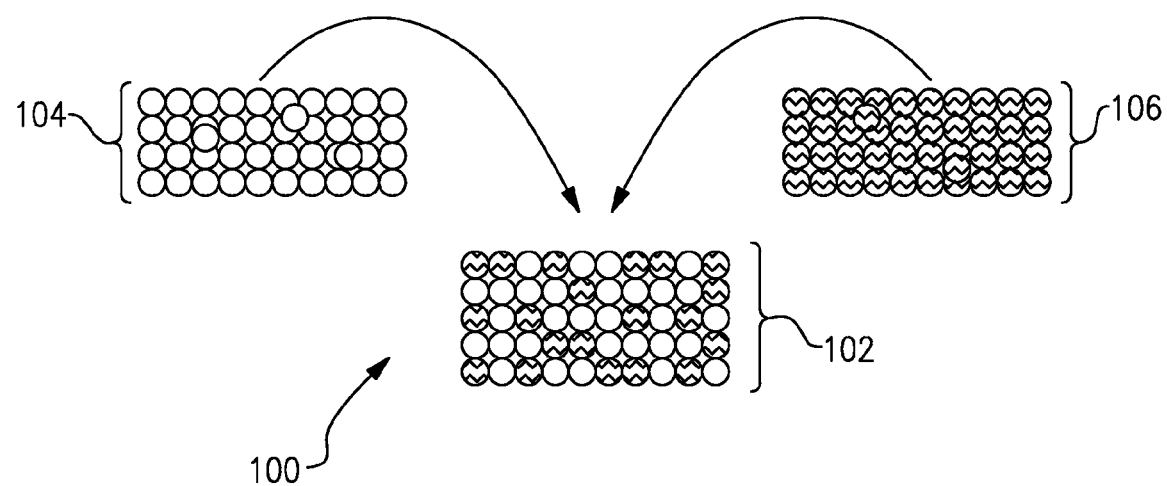
FIG. 1 illustrates an example nickel braze alloy composition that includes a blend of a first nickel alloy and a second nickel alloy.

FIG. 1 illustrates an example nickel braze alloy composition 100 for repairing a nickel alloy substrate. The nickel alloy substrate may be any type of substrate, such as a gas turbine engine airfoil. As will be described, the nickel braze alloy composition 100 provides enhanced environmental resistance to corrosion relative to the nickel alloy substrate as compared to some known nickel braze alloys.

In the disclosed example, the nickel braze alloy composition 100 includes a blend 102 of a first nickel alloy 104 and a second nickel alloy 106. The first nickel alloy 104 and the second nickel alloy 106 are schematically shown as powders; however, the first nickel alloy 104 and the second nickel alloy 106 may be in the form of a wire, powder slurry, or other form that is suitable for a brazing process.

The first nickel alloy 104 may be a high melting temperature nickel alloy and the second nickel alloy 106 may be a low melting temperature nickel alloy relative to the high melting temperature nickel alloy. That is, the first nickel alloy 104 is a different chemical composition than the second nickel alloy 106. For instance, the first nickel alloy 104 may have an equivalent composition to the nickel alloy substrate intended to for repair.

In one example, the first nickel alloy 104 includes up to about 0.02 wt % of boron and the second nickel alloy 106 includes boron in an amount no greater than 1.0 wt %. Boron contributes to lowering the melting temperature of nickel alloys but may be detrimental to forming a stable oxide scale relative to the nickel alloy substrate. Thus, using the relatively low level of boron in the second nickel alloy 106 provides the benefit of a lower melting temperature for the brazing process and a combined composition of the blend 102 that is relatively low in boron and capable of forming a stable oxide scale that functions as an oxygen barrier for enhanced environmental resistance. In a further example, the second nickel alloy 106 may include about 0.45 wt %-0.55 wt % of boron to provide an even more stable oxide scale. The term "about" as used in this description relative to compositions or other values refers to possible variation in the given value, such as normally accepted variations or tolerances in the art.

The first nickel alloy 104 and the second nickel alloy 106 may be of a variety of different compositions to facilitate enhanced environmental resistance. For example, the first nickel alloy 104 may include about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel. The second nickel alloy may include about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt % or 0.45 wt %-0.55 wt % of boron as described above, and a balance of nickel.

As may be appreciated, any of the compositions of this disclosure may include other elements. Alternatively, any of the compositions of this disclosure may include only the elements listed in the particular composition. In another alternative, the compositions may include only other impurity elements that do not affect the properties of the alloy, such as oxidation tendencies, or elements that are unmeasured or undetectable in the alloy.

Additionally, the first nickel alloy 104 may be any of the example compositions 1-5 in Table I below. In further examples, the first nickel alloy 104 may be any of the example compositions 6-10 in Table II below, and the second nickel alloy 106 may be the example composition 11 in Table II.

TABLE I

| Element | First Alloy Powder Composition (wt %) | | | | |
|---------|------|------|------|------|------|
|         | 1 | 2 | 3 | 4 | 5 |
| Cr | 6.6-7 | 6-6.8 | 6.6-7 | 4.75-5.25 | 9.5-10.5 |
| Al | 5.95-6.25 | 5.7-6.1 | 5.94-6.3 | 5.5-5.8 | 6.5-6.7 |
| Co | 11.5-12.5 | 12.1-13 | 11.45-12.05 | 9.5-10.5 | — |
| Ta | 6-6.6 | 3.75-4.25 | 6-6.6 | 8.4-9 | 3.9-4.3 |
| Mo | 1.3-1.7 | 1.5-1.9 | 1.3-1.7 | 1.7-2.1 | 1.75-2.25 |
| W | 4.7-5.1 | 6-6.8 | 4.7-5.1 | 5.6-6.2 | 3-3.4 |
| Re | 2.6-3 | 2.75-3.25 | 2.6-3 | 2.8-3.2 | — |
| Si | — | — | — | — | — |
| B | — | 0.01-.0.15 | 0.01-0.02 | — | 0.004-0.01 |
| Hf | 1-1.4 | 1-2 | 1.3-1.7 | 0.05-0.15 | 1.05-1.25 |
| C | 0.1-0.14 | 0.08-0.12 | 0.1-0.14 | — | 0.08-0.13 |
| Zr | — | 0.04-.012 | — | — | 0.25-0.35 |
| Ni | Bal. | Bal. | Bal. | Bal. | Bal. |

TABLE II

| Element | First Alloy Powder Composition (wt %) | | | | | Second Alloy Powder Composition (wt %) |
|---------|------|------|------|------|------|------|
|         | 6 | 7 | 8 | 9 | 10 | 11 |
| Cr | 22 | 6.4 | 6.8 | 5 | 10 | 22 |
| Al | 6.1 | 5.9 | 6.12 | 5.65 | 6.6 | 6 |
| Co | 12 | 12.55 | 11.55 | 10 | — | 12 |
| Ta | 6.3 | 4 | 6.3 | 8.7 | 4.1 | — |
| Mo | 1.5 | 1.7 | 1.5 | 1.9 | 2 | — |
| W | 4.9 | 6.4 | 4.9 | 5.9 | 3.2 | — |
| Re | 2.8 | 3 | 2.8 | 3 | — | — |
| Si | — | — | — | — | — | — |
| B | — | 0.013 | 0.015 | — | 0.007 | 0.013 |
| Hf | 1.2 | 1.5 | 1.5 | 0.1 | 1.15 | 1.5 |
| C | 0.12 | 0.1 | 0.12 | — | 0.105 | 0.1 |
| Zr | — | 0.08 | — | — | 0.3 | 0.08 |
| Ni | Bal. | Bal. | Bal. | Bal. | Bal. | Bal. |

The blend 102 may include 20 wt %-80 wt % of the first nickel alloy 104 and 20 wt %-80 wt % of the second nickel alloy 106. For instance, the blend 102 may exclusively include the first nickel alloy 104 and the second nickel alloy 106 such that the sum of the selected amounts totals 100 wt %. In another example, the blend 102 may include only the first nickel alloy 104, the second nickel alloy 106, and a binder material. In a further example, the blend 102 may include other constituents, but relative to a total amount of the first nickel alloy 104 and the second nickel alloy 106, the blend 102 includes 20 wt %-80 wt % of the first nickel alloy 104 and 20 wt %-80 wt % of the second nickel alloy 106.

Within the ranges above, the blend 102 may include any ratio of the first nickel alloy 104 and the second nickel alloy 106 (e.g., depending on the desired combined alloy composition, brazing process, or other parameters). For instance, the blend 102 may include about 40 wt % of the first nickel alloy 104 and about 60 wt % of the second nickel alloy 106, about 60 wt % of the first nickel alloy 104 and about 40 wt % of the second nickel alloy 106, about 20 wt % of the first nickel alloy 104 and about 80 wt % of the second nickel alloy 106, or about 80 wt % of the first nickel alloy 104 and about 20 wt % of the second nickel alloy 106. In one example, the blend having about 60 wt % of the first nickel alloy 104 and about 40 wt % of the second nickel alloy 106 exhibits a desirable balance of braze processability and environmental resistance. Given this description, one of ordinary skill in the art will recognize desirable ratios of the first nickel alloy 104 and the second nickel alloy 106 to meet their particular needs.

The blend 102 may have a variety of different combined alloy compositions, depending on the blend ratio and compositions of the first braze alloy 104 and the second braze alloy 106. For example, the combined alloy composition may include about 8 wt %-20.3 wt % of chromium, about 5.5 wt %-6.7 wt % of aluminum, about 2.3 wt %-12.9 wt % of cobalt, about 0.7 wt %-7.2 wt % of tantalum, about 0.25 wt %-1.8 wt % of molybdenum, about 0.6 wt %-5.5 wt % of tungsten, up to 2.6 wt % of rhenium, about 1.1 wt %-5.1 wt % of silicon, boron in an amount no greater than 0.8 wt %, hafnium in an amount no greater than 1.6 wt %, up to about 0.12 wt % of carbon, up to about 0.3 wt % of zirconium, and a balance of nickel. For instance, the combined alloy composition of the blend 102 may be any of the example compositions 12-15 in Table III below.

In another example, the blend 102 includes about 60 wt % of the first nickel alloy 104 and about 40 wt % of the second nickel alloy 106 and may have any of the example compositions 16-20 in Table IV below.

In further examples, the blend 102 may include about 40 wt % of the first nickel alloy 104 and about 60 wt % of the second nickel alloy 106 and may have any of the example compositions 21-25 in Table V below.

In another example, the blend 102 includes about 20 wt % of the first nickel alloy 104 and about 80 wt % of the second nickel alloy 106 and may have any of the example compositions 26-30 in Table VI below.

In another example, the blend 102 includes about 80 wt % of the first nickel alloy 104 and about 20 wt % of the second nickel alloy 106 and may have any of the example compositions 31-35 in Table VII below.

TABLE III

| Element | Combined Alloy Powder Composition (wt %) | | | |
|---------|------|------|------|------|
|         | 12 | 13 | 14 | 15 |
| Cr | 11.35-15.4 | 14.6-17.9 | 17.9-20.3 | 8.0-13.0 |
| Al | 5.5-6.6 | 5.6-6.5 | 5.6-6.4 | 5.5-6.7 |
| Co | 4.6-12.8 | 6.9-12.7 | 9.2-12.6 | 2.3-12.9 |
| Ta | 2.25-4 | 1.5-3.6 | 0.7-1.8 | 3.0-7.2 |
| Mo | 0.7-1.35 | 0.5-0.9 | 0.2-0.5 | 1.0-1.8 |
| W | 1.8-4.1 | 1.2-2.8 | 0.6-1.4 | 2.4-5.5 |
| Re | 2 max | 1.3 max | 0.7 max | 2.6 max |
| Si | 2.2-2.6 | 3.4-3.8 | 4.5-5.1 | 1.1-1.3 |
| B | 0.1-2.3 | 0.2-0.4 | 0.3-0.5 | 0.15 max |
| Hf | 0.03-1.2 | 0.02-0.8 | 0.4 max | 1.6 max |
| C | 0.1 max | 0.03-0.06 | 0.03 max | 0.06-0.15 |
| Zr | 0.25 max | 0.2 max | 0.1 max | 0.3 max |
| Ni | Bal. | Bal. | Bal. | Bal. |

TABLE IV

60 wt % First Powder/40 wt % Second Powder Combined Composition (wt %)

| Element | 16 | 17 | 18 | 19 | 20 |
|---|---|---|---|---|---|
| Cr | 12.46-13.3 | 12.1-13.18 | 12.46-13.3 | 11.35-12.25 | 14.2-15.4 |
| Al | 5.85-6.27 | 5.7-6.18 | 5.84-6.3 | 5.58-6 | 6.18-6.54 |
| Co | 11.5-12.5 | 11.86-12.8 | 11.47-12.23 | 10.3-11.3 | 4.6-5 |
| Ta | 3.6-3.96 | 2.25-2.55 | 3.6-3.96 | 5.04-5.4 | 2.34-2.58 |
| Mo | 0.78-1.02 | 0.9-1.14 | 0.78-1.02 | 1.02-1.26 | 1.05-1.35 |
| W | 2.82-3.06 | 3.6-4.08 | 2.82-3.06 | 3.36-3.72 | 1.8-2.04 |
| Re | 1.56-1.8 | 1.65-1.95 | 1.56-1.8 | 1.68-1.92 | — |
| Si | 2.28-2.52 | 2.28-2.52 | 2.28-2.52 | 2.28-2.52 | 2.28-2.52 |
| B | 0.18-0.22 | 0.186-0.229 | 0.186-0.232 | 0.18-0.22 | 0.182-0.226 |
| Hf | 0.6-0.84 | 0.6-1.2 | 0.78-1.02 | 0.03-0.09 | 0.63-0.75 |
| C | 0.06-0.084 | 0.048-0.072 | 0.06-0.084 | — | 0.048-0.078 |
| Zr | — | 0.024-0.072 | — | — | 0.15-0.21 |
| Ni | Bal. | Bal. | Bal. | Bal. | Bal. |

TABLE V

40 wt % First Powder/60 wt % Second Powder Combined Composition (wt %)

| Element | 21 | 22 | 23 | 24 | 25 |
|---|---|---|---|---|---|
| Cr | 15.39-16.45 | 15.15-16.37 | 15.39-16.45 | 14.65-15.75 | 16.55-17.84 |
| Al | 5.8-6.28 | 5.7-6.22 | 5.8-6.3 | 5.62-6.1 | 6.02-6.46 |
| Co | 11.5-12.5 | 11.74-12.7 | 11.48-12.32 | 10.7-11.7 | 6.9-7.5 |
| Ta | 2.4-2.64 | 1.5-1.7 | 2.4-2.64 | 3.36-3.6 | 1.56-1.72 |
| Mo | 0.52-0.68 | 0.6-0.76 | 0.52-0.68 | 0.68-0.84 | 0.7-1.2 |
| W | 1.88-2.04 | 2.4-2.72 | 1.88-2.04 | 2.24-2.48 | 1.2-1.36 |
| Re | 1.04-1.2 | 1.1-1.3 | 1.04-1.2 | 1.12-1.28 | — |
| Si | 3.42-3.78 | 3.42-3.78 | 3.42-3.78 | 3.42-3.78 | 3.42-3.78 |
| B | 0.27-0.33 | 0.274-0.336 | 0.274-0.338 | 0.27-0.33 | 0.272-0.334 |
| Hf | 0.4-0.56 | 0.4-0.8 | 0.52-0.68 | 0.02-0.06 | 0.42-0.5 |
| C | 0.04-0.056 | 0.032-0.048 | 0.04-0.056 | — | 0.032-0.052 |
| Zr | — | 0.016-0.048 | — | — | 0.1-0.14 |
| Ni | Bal. | Bal. | Bal. | Bal. | Bal. |

TABLE VI

20 wt % First Powder/80 wt % Second Powder Combined Composition (wt %)

| Element | 26 | 27 | 28 | 29 | 30 |
|---|---|---|---|---|---|
| Cr | 18.32-19.6 | 18.2-19.56 | 18.32-19.6 | 17.95-19.25 | 18.9-20.3 |
| Al | 5.75-6.29 | 5.7-6.26 | 5.748-6.3 | 5.66-6.2 | 5.86-6.38 |
| Co | 11.5-12.5 | 11.62-12.6 | 11.49-12.41 | 11.1-12.1 | 9.2-10.0 |
| Ta | 1.2-1.32 | 0.75-0.85 | 1.2-1.32 | 1.68-1.8 | 0.78-0.86 |
| Mo | 0.26-0.34 | 0.3-0.38 | 0.26-0.34 | 0.34-0.42 | 0.35-0.45 |
| W | 0.94-1.02 | 1.2-1.36 | 0.94-1.02 | 1.12-1.24 | 0.6-0.68 |
| Re | 0.52-0.6 | 0.55-0.65 | 0.52-0.6 | 0.56-0.64 | — |
| Si | 4.56-5.04 | 4.56-5.04 | 4.56-5.04 | 4.56-5.04 | 4.56-5.04 |
| B | 0.36-.044 | 0.362-0.443 | 0.362-0.444 | 0.36-0.44 | 0.361-0.442 |
| Hf | 0.2-0.28 | 0.2-0.4 | 0.26-0.34 | 0.01-0.03 | 0.21-0.25 |
| C | 0.02-0.028 | 0.016-0.024 | 0.02-0.028 | — | 0.016-0.026 |
| Zr | — | 0.008-0.024 | — | — | 0.05-0.07 |
| Ni | Bal. | Bal. | Bal. | Bal. | Bal. |

TABLE VII

80 wt % First Powder/20 wt % Second Powder Combined Composition (wt %)

| Element | 31 | 32 | 33 | 34 | 35 |
|---|---|---|---|---|---|
| Cr | 9.53-10.15 | 9.05-9.99 | 9.53-10.15 | 8.05-8.75 | 11.85-12.95 |
| Al | 5.9-6.26 | 5.7-6.14 | 5.892-6.3 | 5.54-5.9 | 6.34-6.62 |
| Co | 11.5-12.5 | 11.98-12.9 | 11.46-12.14 | 9.9-10.9 | 2.3-2.5 |
| Ta | 4.8-5.28 | 3.0-3.4 | 4.8-5.28 | 6.72-7.2 | 3.12-3.44 |
| Mo | 1.04-1.36 | 1.2-1.52 | 1.04-1.36 | 1.36-1.68 | 1.4-1.8 |

TABLE VII-continued

| | 80 wt % First Powder/20 wt % Second Powder Combined Composition (wt %) | | | | |
|---|---|---|---|---|---|
| Element | 31 | 32 | 33 | 34 | 35 |
| W | 3.76-4.08 | 4.8-5.44 | 3.76-4.08 | 4.48-4.96 | 2.4-2.72 |
| Re | 2.08-2.4 | 2.2-2.6 | 2.08-2.4 | 2.24-2.56 | — |
| Si | 1.14-1.26 | 1.14-1.26 | 1.14-1.26 | 1.14-1.26 | 1.14-1.26 |
| B | 0.09-0.11 | 0.098-0.122 | 0.098-0.126 | 0.09-0.11 | 0.093-0.118 |
| Hf | 0.8-1.12 | 0.8-1.6 | 1.04-1.36 | 0.04-0.12 | 0.84-1.0 |
| C | 0.08-0.112 | 0.064-0.096 | 0.08-0.112 | — | 0.064-0.104 |
| Zr | — | 0.032-0.096 | — | — | 0.2-0.28 |
| Ni | Bal. | Bal. | Bal. | Bal. | Bal. |

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure may only be determined by studying the following claims.

What is claimed is:

1. A nickel braze alloy composition comprising:
a blend of a first nickel alloy and a second nickel alloy, the first nickel alloy having a first composition including about 4.75 wt %-10.5 wt % of chromium, about 5.5 wt %-6.7 wt % of aluminum, up to about 13 wt % cobalt, about 3.75 wt %-9.0 wt % of tantalum, about 1.3 wt %-2.25 wt % of molybdenum, about 3.0 wt %-6.8 wt % of tungsten, about 2.6 wt %-3.25 wt % of rhenium, up to about 0.02 wt % of boron, about 0.05 wt %-2.0 wt % of hafnium, up to about 0.14 wt % of carbon, up to about 0.35 wt % of zirconium, and a balance of nickel, and the second nickel alloy having a second composition including about 21.25 wt %-22.75 wt % of chromium, about 5.7 wt %-6.3 wt % of aluminum, about 11.5 wt %-12.5 wt % of cobalt, about 5.7 wt %-6.3 wt % of silicon, boron in an amount no greater than 1.0 wt %, and a balance of nickel.

2. The nickel braze alloy composition as recited in claim 1, wherein the first composition includes about 6.6 wt %-7 wt % of chromium, about 5.95 wt %-6.25 wt % of aluminum, about 11.5 wt %-12.5 wt % of cobalt, about 6.0 wt %-6.6 wt % of tantalum, about 1.3 wt %-1.7 wt % molybdenum, about 4.7 wt %-5.1 wt % of tungsten, about 2.6 wt %-3.0 wt % of rhenium, about 1.08 wt %-1.4 wt % of hafnium, about 0.1 wt %-0.14 wt % of carbon, and the balance of nickel.

3. The nickel braze alloy composition as recited in claim 1, wherein the first composition includes about 6.0 wt %-6.8 wt % of chromium, about 5.7 wt %-6.0 wt % of aluminum, about 12.1 wt %-13.0 wt % of cobalt, about 3.75 wt %-4.25 wt % of tantalum, about 1.5 wt %-1.9 wt % of molybdenum, about 6.0 wt %-6.8 wt % of tungsten, about 2.75 wt %-3.25 wt % of rhenium, about 0.01 wt %-0.015 wt % of boron, about 1.0 wt %-2.0 wt % of hafnium, about 0.08 wt %-0.12 wt % of carbon, about 0.04 wt %-0.12 wt % of zirconium, and the balance of nickel.

4. The nickel braze alloy composition as recited in claim 1, wherein the first nickel alloy includes about 6.6 wt %-7.0 wt % of chromium, about 5.94 wt %-6.3 wt % of aluminum, about 11.45 wt %-12.05 wt % of cobalt, about 6.0 wt %-6.6 wt % of tantalum, about 1.3 wt %-1.7 wt % of molybdenum, about 4.7 wt %-5.1 wt % of tungsten, about 2.6 wt %-3.0 wt % of rhenium, about 0.01 wt %-0.02 wt % of boron, about 1.3 wt %-1.7 wt % of hafnium, about 0.1 wt %-0.14 wt % of carbon, and the balance of nickel.

5. The nickel braze alloy composition as recited in claim 1, wherein the first nickel alloy includes about 4.75 wt %-5.25 wt % of chromium, about 5.5 wt %-5.8 wt % of aluminum, about 9.5 wt %-10.5 wt % of cobalt, about 8.4 wt %-9.0 wt % of tantalum, about 1.7 wt %-2.1 wt % of molybdenum, about 5.6 wt %-6.2 wt % of tungsten, about 2.8 wt %-3.2 wt % of rhenium, about 0.05 wt %-0.15 wt % of hafnium, and the balance of nickel.

6. The nickel braze alloy composition as recited in claim 1, wherein the first nickel alloy includes about 9.5 wt %-10.5 wt % of chromium, about 6.5 wt %-6.7 wt % of aluminum, about 3.9 wt %-4.3 wt % of tantalum, about 1.75 wt %-2.25 wt % of molybdenum, about 3.0 wt %-3.4 wt % of tungsten, about 0.004 wt %-0.01 wt % of boron, about 1.05 wt %-1.25 wt % of hafnium, about 0.08 wt %-0.13 wt % of carbon, 0.25 wt %-0.35 wt % of zirconium, and the balance of nickel.

7. The nickel braze alloy composition as recited in claim 1, wherein the second nickel alloy includes about 22 wt % of chromium, about 6.0 wt % of aluminum, about 12.0 wt % of cobalt, about 6.0 wt % of silicon, about 0.5 wt % of boron, and the balance of nickel.

8. The nickel braze alloy composition as recited in claim 1, wherein the second nickel alloy includes about 0.45 wt %-0.55 wt % of boron.

9. The nickel braze alloy composition as recited in claim 1, wherein the blend includes about 20 wt %-80 wt % of the first nickel alloy and about 20 wt %-80 wt % of the second nickel alloy.

10. The nickel braze alloy composition as recited in claim 1, wherein the blend consists essentially of about 60 wt % of the first nickel alloy and about 40 wt % of the second nickel alloy.

11. The nickel braze alloy composition as recited in claim 1, wherein the first nickel alloy and the second nickel alloy are powders.

* * * * *